United States Patent

Groth

[11] 3,901,997
[45] Aug. 26, 1975

[54] HEAT-REFLECTING GLASS SHEETS
[75] Inventor: Rolf Groth, Witten, Germany
[73] Assignee: Flachglas Aktiengesellschaft Delog-Detag, Furth-Bavaria, Germany
[22] Filed: Jan. 22, 1973
[21] Appl. No.: 325,873

[30] Foreign Application Priority Data
Jan. 28, 1972 Germany............................ 2203943

[52] U.S. Cl. .................... 428/428; 350/1; 427/163; 427/167; 427/250; 427/404; 428/469; 428/918
[51] Int. Cl.² .................... C03C 17/22; G02B 1/10; B32B 17/06; B32B 15/00
[58] Field of Search .......... 117/71 R, 124 R, 124 C, 117/33.3, 124 A, 124 B, 125; 161/196, 1, 4, 193, 196, 225, 408–410; 350/1; 427/163, 167

[56] References Cited
UNITED STATES PATENTS

| | | | |
|---|---|---|---|
| 2,660,925 | 12/1953 | Turner..................................... | 350/1 |
| 2,676,117 | 4/1954 | Colbert et al........................... | 117/71 |
| 2,700,323 | 1/1955 | Schroeder............................... | 350/1 |
| 2,782,676 | 2/1957 | Osterberg............................. | 117/71 R |
| 2,834,689 | 5/1958 | Jupnik .................................. | 117/33.3 |
| 3,235,397 | 2/1966 | Millendorfer........................ | 117/33.3 |
| 3,290,203 | 12/1966 | Antonson et al. .............. | 161/408 X |
| 3,356,522 | 12/1967 | Libbert................................. | 117/33.3 |
| 3,505,092 | 4/1970 | Ryan et al........................... | 117/71 R |
| 3,537,944 | 11/1970 | Grubb et al............................ | 161/4 |
| 3,640,832 | 2/1972 | Kurz ................................ | 161/408 X |
| 3,660,137 | 5/1972 | Furuuchi et al.................. | 117/71 R |
| 3,846,152 | 11/1974 | Franz.................................. | 117/33.3 |
| 3,846,165 | 11/1974 | Ettenberg et al. ............. | 117/33.3 X |
| 3,849,244 | 11/1974 | Groth.............................. | 117/71 R |

Primary Examiner—Harold Ansher

[57] ABSTRACT

A method of producing a heat-reflecting glass sheet which comprises applying to a glass sheet by vacuum deposition a zinc sulphide anti-reflection layer followed by a metal layer, of for example gold, silver or copper, with a high infrared reflection capacity. In accordance with the invention, the colour-imparting interference action of the zinc sulphide layer is stabilized to provide colour uniformity, even if large glass surfaces are involved, by first applying to the glass sheet a vacuum-coated dielectric intermediate layer which is substantially absorption-free for visible light and has a refractive index corresponding to that of the glass sheet. Preferred materials for the said intermediate layer are a metal oxide or metal oxide mixture, silicon oxides such as silicon monoxide and glass. The thickness of the intermediate layer is suitably substantially less than the wavelength of visible light.

4 Claims, 3 Drawing Figures

HEAT-REFLECTING GLASS SHEETS

BACKGROUND OF THE INVENTION

This invention relates to a method of producing a heat-reflecting glass sheet in which a zinc sulphide anti-reflection layer and subsequently a metal layer with a high infrared reflection capacity are applied to a glass sheet by vacuum deposition. The invention also relates to a heat-reflecting glass sheet produced by such method.

Heat-reflecting glass sheets of this kind are used more particularly in glazing vehicles and buildings to prevent any excessive temperature rise in the interior of vehicles or buildings due to incident radiation from the sun.

Gold, silver and copper have been found to be particularly suitable as materials for the metal layer having a high infrared reflection capacity. The light transmissivity of such metal layers may be additionally increased, without any substantial reduction of the heat-reflecting property, by the application of anti-reflection layers comprising material with a high refractive index, for example cerium oxide, titanium oxide or zinc sulphide. The undesirable glare effect is also substantially reduced by reducing the reflectivity of the metal layer over the visible range of the spectrum. The anti-reflection layers moreover provide the external appearance of the heat reflecting glass sheets with an architecturally desirable colour tone, for example grey-blue or bronze.

Gold has been found particularly suitable among the previously mentioned metals used to provide infrared reflection because this metal is characterised by a high degree of chemical stability, and further gold layers have the desired selective radiation transmissivity to a particularly high degree. Zinc sulphide has been found suitable as material for an anti-reflection layer, such material being relatively easily evaporated at temperatures of approximately 1200°C which can be readily controlled under manufacturing conditions.

A stratified system in which a zinc sulphide antireflection layer is first applied to the glass sheet followed by a vacuum deposition of a gold layer is of particular interest in known heat-reflecting glass sheets which are produced by the method mentioned hereinbefore. If the thickness of the zinc sulphide anti-reflection layer amounts to, for example, 500A and the thickness of the gold layer amounts to approximately 250 A, the exterior of the heat-reflecting glass sheet will have an architecturally desirable bronze colour tone. furthermore, the zinc sulphide anti-reflection layer increases the transmissivity more particularly in the long wave visible range of the spectrum so that viewing through such a glass sheet is practially neutral with respect to colour by contrast to the green colour cast of a heat reflecting glass sheet which is merely provided with a gold layer of the same thickness. The layer thicknesses selected to this end naturally depend on the desired light transmissivity and the required colour effect of the glass sheet. A zinc sulphide anti-reflection layer thickness range of approximately 200 to 600 A preferably 400 to 550 A is of particular interest in terms of manufacturing technology, the gold layer having a thickness of approximately 150 to 500 A.

However, it has been shown that this method for the production of such heat-reflecting glass sheets involves difficulties with regard to insufficient colour uniformity, more particularly with respect to the external appearance. This applies especially if the vacuum-coating method is used for relatively large glass sheets of the kind required for most applications. If the known method is applied to glass sheets of this kind, the bronze colour tone is subjected to substantial colour shift towards a reddish colour cast which has a highly undesirable architectural effect as regards the external appearance. These colour shifts occur although the zinc sulphide anti-reflection layer in each case reliably performs its function as an adhesion layer for the gold stratum.

SUMMARY OF THE INVENTION

It is an object of the invention to provide a heat-reflecting glass sheet and a method of producing the same in which adequate colour uniformity is achieved even if large glass surfaces are vacuum-coated.

Accordingly, in one aspect, the invention provides a method of producing a heat-reflecting glass sheet in which a zinc sulphide anti-reflection layer and subsequently a metal layer with a high infrared reflection capacity are applied to a glass sheet by vacuum deposition, which method includes the step of first applying to the glass sheet by vacuum coating a dielectric intermediate layer which is substantially absorption-free with respect to visible light and which comprises a material whose refractive index corresponds substantially to that of the glass sheet.

In another aspect, the invention provides a heat-reflecting glass sheet comprising a glass sheet, a zinc-sulphide anti-reflection layer which is vacuum-coated on to the glass sheet and a metal layer of high infrared reflection capacity which is vacuum-coated on to the anti-reflection stratum, in which heat-reflecting sheet an intermediate layer of a material with a refractive index which corresponds substantially to that of the glass sheet and which is substantially absorption-free for visible light is disposed between the glass sheet and the zinc sulphide anti-reflection layer.

The provision of the intermediate layer between the glass sheet and the zinc sulphide anti-reflection layer surprisingly enables the latter to be stabilised with respect to its colour-imparting interference action, so that complete colour uniformity is achieved even on large surfaces.

Metal oxide layers or mixed metal oxide layers as well as layers of silicon oxide and glass layers produced by high vacuum coating have been found to be suitable materials for the intermediate layer. Silicon oxide and glass layers are suited because their refractive index in practice substantially coincides with that of the glass sheet.

A silicon oxide layer may be vacuum-coated by known methods. Electron-beam evaporation of silicon dioxide or reactive evaporation of silicon monoxide is suitable to this end, a vacuum of the order of $10^{-4}$ Torr being employed in the last mentioned case. Under normal production conditions the last mentioned method results in the production of layers which correspond approximately to the composition $Si_2O_3$ (see also E. Cremor, Th. Kraus and E. Ritter, "Über das Absorptionsvermogen dunner Siliziumoxydschichten in Abhangigkeit vom Oxydationsgrad" (the absorption capacity of thin silicon oxide layers in relation to the degree of oxidation) Zeitschrift fur Elektrochemie, vol. 62 (1958), pages 939–941).

Layer thicknesses covering the range of approximately 30 to 100 A have been found suitable for the silicon oxide layers. Such layers are sufficient to ensure a completely adequate layer thickness even with the conventional surface texture of commercial glass. It is of course possible to employ thicker layers but this increase of the thickness of the intermediate layer does not provide any further advantages with regard to the colour uniformity achieved.

It has been found that the light transmissivity and the heat-reflecting capacity of the zinc sulphide metal coating, more particularly of the zinc sulphide/gold coating, is not changed by the silicon oxide layer. Colour changes with respect to reflection and transmission do not occur because the refractive index of silicon oxide layers, i.e. of $SiO_2$ or $Si_2O_3$ layers, differ so slightly from the refractive index of the glass sheet that no additional interference effects are caused, especially with the layer thicknesses which are preferably employed and which are small with respect to the wavelength of visible light. Accordingly, no special requirements are made on the uniformity of the silicon oxide layers, a fact which results in a substantial advantage as regards the manufacturing process.

The zinc sulphide layers applied to the intermediate layer suitably has a thickness of 200–600, preferably 400–550 A so that it functions not only as adhesive layer but also as anti-reflection layer for the subsequent metal layer in the visible range of the spectrum or at least over part thereof.

The metal layer having a high infrared reflection capacity preferably comprises gold but it may comprise silver or copper.

In a further embodiment of the invention, at least one further interference and/or protective layer is vacuum-coated on to the metal layer.

Embodiments of the invention will now be described in more detail, by way of example, with reference to the appended drawing.

DESCRIPTION OF PREFERRED EMBODIMENTS

Figure 1:
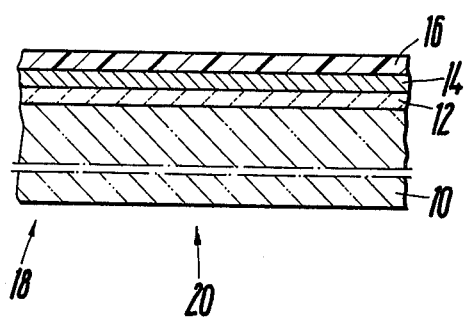
FIG. 1 is a partial section through a glass sheet with an intermediate layer of silicon oxide, a zinc sulphide layer deposited on such intermediate layer and functioning as an anti-reflection layer and a gold infrared reflection layer applied on to the zinc sulphide layer.

FIG. 1 of the drawing is a partial section through a heat-reflecting glass sheet 18 comprising a float glass sheet 10 with an overall dimension of 300 × 245 cm and a thickness of 6 mm. In manufacturing the heat-reflecting glass sheet, one of the surfaces of the sheet 10 is cleaned in conventional manner in a vacuum coating plant at a pressure of $3 \times 10^{-2}$ Torr by glow discharge and is subsequently provided with a silicon oxide layer 12 at a further reduced pressure in a vacuum of $1.3 \times 10^{-4}$ Torr by the reactive evaporation of silicon oxide. The thickness of the silicon oxide layer 12 amounts to 50 A. The outer surface of the silicon oxide layer 12, which faces away from the glass sheet 10, is subsequently provided with a zinc sulphide layer 14 at a pressure of $5 \times 10^{-5}$ Torr following the vacuum coating of the silicon oxide layer. The thickness of the zinc sulphide layer 14 amounts to 500 A. A gold layer 16 having a thickness of 250 A is also applied by vacuum coating and forms an outermost layer.

The sheet 18 has a bronze colour tone when seen from the glass side in the direction of the arrow 20 and has exceptional colour uniformity.

Figure 2:
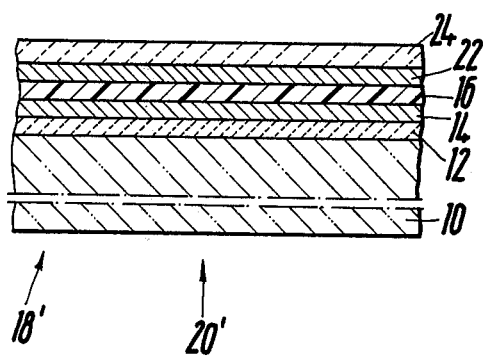
FIG. 2 shows a modification of the embodiment of FIG. 1 having basically the same configuration, but with an interference layer externally covered by a protective layer, applied on to the gold layer.

The sheet 18' illustrated in FIG. 2 is a modification of the sheet 18 of FIG. 1 in which a further interference layer 22 of zinc sulphide is vacuum-coated on the outside surface of the gold layer 16, the outermost layer of the sheet 18 being formed by a protective layer 24 which is deposited on the layer 22 and comprises silicon oxide in the present case.

The sheet 18' of FIG. 2 achieves an exceptionally high degree of colour uniformity as in the case of sheet 18 of FIG. 1, but in contrast to the sheet 18 of FIG. 1 and because of the additional layers 22, 24 the colour tone is shifted towards blue-grey when viewing from the glass side in the direction of the arrow 20'.

Figure 3:
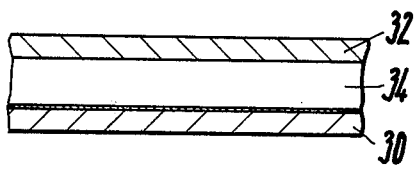
FIG. 3 shows a double-glazed pane in a partial cross-section and including a heat-reflecting glass sheet in accordance with FIG. 1.

FIG. 3 is a section through a simplified view of a double-glazed pane embodying the invention, with two glass sheets 30, 32 spaced apart from each other and an air space 34 between the aforementioned glass sheets. The glass sheet 30 is constructed in the same way as the glass sheet 18 of FIG. 1 while the glass sheet 32 is a plain glass sheet.

I claim:

1. A heat-reflecting glass sheet, comprising:
   a glass sheet;
   a zinc sulphide anti-reflection layer which is vacuum-coated onto the glass sheet in a thickness of 200 to 600 A; and a metal layer of high infrared reflection capacity which is vacuum-coated onto the anti-reflection layer and having a thickness of 150 to 500 A;
   wherein the improvement comprises;
   a dielectric intermediate layer which is substantially absorption-free for visible light and consists essentially of a member of the group consisting of silicon monoxide and silicon dioxide with a refractive index corresponding substantially to that of the glass sheet;
   the said intermediate layer being vacuum-coated between the glass sheet and the zinc sulphide anti-reflection layer and having a thickness of 30 to 100 A.

2. The heat-reflecting glass sheet as claimed in claim 1, wherein the metal layer comprises gold.

3. The heat-reflecting glass sheet according to claim 1, wherein at least one further protective layer is disposed on that surface of the metal layer which faces away from the zinc sulphide anti-reflection layer, said further protective layer consisting essentially of zinc sulphide.

4. The heat-reflecting glass sheet according to claim 3 and including a protective layer deposited on said further protective layer of zinc sulphide and consisting essentially of a silicon oxide.

* * * * *